(12) United States Patent
Döhring et al.

(10) Patent No.: US 9,273,472 B2
(45) Date of Patent: Mar. 1, 2016

(54) LAMINATE PANEL WITHOUT COUNTERACTING PAPER

(75) Inventors: Dieter Döhring, Großenhain (DE); Hans Schäfer, Großenhain (DE)

(73) Assignee: Kronoplus Technical AG, Niederteufen (CH)

( * ) Notice: Subject to any disclaimer, the term of this patent is extended or adjusted under 35 U.S.C. 154(b) by 0 days.

(21) Appl. No.: 14/353,099

(22) PCT Filed: Oct. 21, 2011

(86) PCT No.: PCT/EP2011/068434
§ 371 (c)(1),
(2), (4) Date: Jul. 3, 2014

(87) PCT Pub. No.: WO2013/056745
PCT Pub. Date: Apr. 25, 2013

(65) Prior Publication Data
US 2014/0329064 A1  Nov. 6, 2014

(51) Int. Cl.
*B32B 3/00* (2006.01)
*E04F 15/10* (2006.01)
*B32B 29/00* (2006.01)
(Continued)

(52) U.S. Cl.
CPC ............... *E04F 15/107* (2013.01); *B32B 3/10* (2013.01); *B32B 5/00* (2013.01); *B32B 21/08* (2013.01); *B32B 27/42* (2013.01); *B32B 29/00* (2013.01); *B32B 29/005* (2013.01); *B32B 38/08* (2013.01); *B32B 2250/04* (2013.01); *B32B 2250/05* (2013.01); *B32B 2255/08* (2013.01); *B32B 2255/12* (2013.01); *B32B 2255/26* (2013.01); *B32B 2260/00* (2013.01); *B32B 2375/00* (2013.01); *B32B 2379/00* (2013.01); *B32B 2471/00* (2013.01); *Y10T 428/24851* (2015.01);
(Continued)

(58) Field of Classification Search
CPC .......... B32B 21/00; B32B 21/04; B44C 5/04; B44C 5/0492; B44C 5/043; Y10T 428/24438; Y10T 428/24736; Y10T 428/24851; Y10T 428/24868; Y10T 428/31957; Y10T 428/31982
See application file for complete search history.

(56) References Cited

U.S. PATENT DOCUMENTS 8,366,854 B2 *   2/2013   Buhlmann ............... 156/235
2002/0096255 A1   7/2002   Mott
(Continued)

FOREIGN PATENT DOCUMENTS

CN   102186942 A   9/2011
DE   19903912 A1   8/2000
(Continued)

OTHER PUBLICATIONS

International Search Report for corresponding patent application No. PCT/EP2011/068434 dated Oct. 9, 2012.
(Continued)

*Primary Examiner* — Elizabeth Mulvaney
(74) *Attorney, Agent, or Firm* — Renner, Otto, Boisselle & Sklar, LLP

(57) ABSTRACT

The present invention relates to a laminate panel (40; 40'; 40"; 40''') with a carrier layer (41; 41'; 41"; 41''') of wood or wood-based material, in which at least the upper side has a decoration and a layer of a cured resin (46; 46'; 46"; 46'''). The rear side of the laminate panel (40; 40'; 40"; 40''') is provided with a paperless counteracting layer of a cured counteracting material (45; 45'; 45"; 45''').

23 Claims, 2 Drawing Sheets

(51) Int. Cl.
*B32B 3/10* (2006.01)
*B32B 5/00* (2006.01)
*B32B 21/08* (2006.01)
*B32B 27/42* (2006.01)
*B32B 38/08* (2006.01)

(52) U.S. Cl.
CPC ...... *Y10T 428/265* (2015.01); *Y10T 428/31634* (2015.04); *Y10T 428/31957* (2015.04)

(56) References Cited

U.S. PATENT DOCUMENTS

2008/0292795 A1 11/2008 Grafenauer
2009/0155612 A1* 6/2009 Pervan et al. ............... 428/498
2010/0300030 A1* 12/2010 Pervan et al. ............... 52/588.1

FOREIGN PATENT DOCUMENTS

| | | |
|---|---|---|
| DE | 10 2008 027235 | 12/2008 |
| DE | 10 2007 062941 | 6/2009 |
| EP | 1454763 | 9/2004 |
| EP | 1627977 | 2/2006 |
| EP | 2345545 | 7/2011 |

OTHER PUBLICATIONS

Office Action for corresponding Chinese patent application No. 201180074318.9 dated Jan. 28, 2015.

Translation of International Preliminary Report on Patentability for corresponding International Patent Application No. PCT/EP2011/068434 dated May 16, 2014.

* cited by examiner

LAMINATE PANEL WITHOUT COUNTERACTING PAPER

1. FIELD OF INVENTION

The present invention relates to a laminate panel as well as a method for its production and a counteracting material that allows for providing a counteracting layer without counteracting paper for the laminate panel.

2. BACKGROUND OF THE INVENTION

In the prior art a plurality of floor coverings are known such as real wood veneer laminate floors. Due to the relative cost efficient production possibilities in particular indoor laminate floors have become more popular in the last decades. Such laminate floors allow for example to imitate in a simple and cost efficient way the optically pleasing appearance of different kinds of wood or other natural materials.

Laminate floors are composed of laminate panels that therefore are provided at their edges with groove and tongue connections for connecting the panels with each other. Typically, such laminate panels are composed of a central carrier layer made of wood or a wood-based material such as MDF, HDF, particle board or OSB and further thinner layers that fulfil different functions.

For example, the appearance that is visible to the user is produced with the aid of a décor layer on the top surface of the carrier layer. This décor layer is directly printed on the carrier layer by means of the so called direct printing process. However, most common is the use of décor papers. The term "laminate panel" shall herein include both panels with paper layers and also direct printed panels, which are not necessarily provided with paper layers, but with a resin layer on the top surface.

When producing the décor by way of a décor paper at first a proper paper layer is printed with a décor for example a real wood imitation or also with a stone imitation. The printed paper is then saturated with a proper resin typically with an amino resin such as melamine and/or urea-formaldehyde resin. The so impregnated paper is then typically cured before further use, so that it can be rolled up on rolls or can be deposited in sheets on pallets and can be stored.

For further usage the impregnated and cured décor paper layer is applied onto the carrier layer before the resin is cured in a further step. The final curing of the resin namely the final curing of the resin molecule chains (and not the curing of the aqueous resin mixture where merely water is extracted) can occur in a separate curing step for example by using radiation such as electron, ultra-violet or infrared radiation. Typically, the curing is however made by the influence of heat and pressure when pressing the layer systems.

Further paper or resin layers can be arranged above the décor layer such as so called overlays. Such overlays are produced similarly to the décor paper layer by means of impregnated papers. A thin suitable paper is impregnated with a resin such as amino resin and is applied onto the décor layer. When curing the overlay layer this firstly opaque paper layer becomes transparent such that the décor lying thereunder becomes visible. The overlay layer serves for protecting the décor against exterior influences and it is known to add abrasion-resistant particles such as corundum particles additionally to the resin that is used for impregnating the overlays in order to increase the abrasion resistance of the subsequent laminate panels. Additionally, a core paper and overlay can be provided with a surface structure when pressing and curing that may match the visible structure of the décor, and simulates for example the haptic impression of the wood surface.

A known difficulty with producing laminate panels in particular using amino resins is that at the latest when pressing various layers of the layer systems to be pressed retract differently. When curing the resins, with which for example décor and overlay paper layers are impregnated, a contraction occurs as a result of a chemical polycondensation. During pressing a plurality of chemical bonds are formed dissociating water. The water moves out of the cured amino resin layer when pressing and thereby the volume shrinks significantly. Also, the used papers can exert tractive forces on the carrier layer during pressing. By these contractions of the layers forces are created that can result in undesired deformations of the carrier layer. The carrier layer bends by the contraction concavely to the top in the direction of the décor layer, or overlay layer respectively, such that the formed panel can only be used with difficulty.

To avoid such deformation of the panels a so-called counteractor is applied to the back surface opposite to the décor in the prior art, which counteractor shall compensate for the traction effects on the top surface. The easiest possibility to provide a counteractor that has the same tractive effect as the layers on the top surface is applying the same layers as on the top surface of the panel also on the back surface, such that the contraction effects of these layers exactly cancel each other out. For cost reasons it is however often not desired to use the high value layers that are used for forming the visible top surface of the panel also on the back surface that it is not visible during use. For this reason combinations of simple cost-efficient counteracting paper and of cost-efficient resins have been developed that are used as a counteracting layer on the back surface of the laminate panels in order to reduce the undesired curvature of the panels during pressing.

A typical example from the prior art is described in DE 199 03 912 A1. According to the method described therein firstly a coloring layer is applied directly onto the top surface of the carrier layer for a laminate panel in the direct pressing process. Onto this décor layer an impregnated overlay paper and onto the back surface of the carrier layer a counteractor is applied in the form of an impregnated counteracting paper. Optionally, it is proposed in DE 199 03 912 A1 for example to dry the impregnated overlay paper and to apply onto it an additionally melamine resin layer into which corundum is sprinkled, in order to provide an abrasion resistant surface for the panel this way. After applying these layers they are pressed in order to produce the finished laminate.

A further example from the prior art is described in DE 10 2008 027 235 A1. According to the application a décor paper that is imprinted and impregnated with an amino resin is applied onto a carrier layer for a laminate panel. To reduce rejects that result from mispressings this patent application proposes to provide also on the back surface of the laminate panel a further décor in the form of an impregnated décor paper instead of a cost-efficient counteractor in the form of a simple counteracting paper and corresponding resin. In other words, in this patent application it is proposed to produce a laminate panel, both surfaces of which are décor surfaces. According to this application it is thereby possible, if during pressing one of the two décor surfaces is damaged, to use the panel nevertheless, because a substitute décor exists on the opposite surface.

Because for each single paper layer costly impregnation steps are necessary, it is desirable to reduce the number of (impregnated) paper layers. Accordingly, the German application DE 10 2007 062 941 A1 proposes a laminate panel with a counteractor that enables to spare the usage of a counteracting paper layer. Instead of using an impregnated counteracting paper it is proposed in this application to apply multiple thin layers of an amino resin directly onto a back surface of a carrier layer for a laminate panel, wherein respectively prior to the application of a further amino resin layer, the prior amino resin layer is pre-dried. Although, it is possible with this method to spare a counteracting paper the alternating application and drying of single thin resin layers is time, cost and process consuming.

With regard to the above cited prior art, the present invention has the problem to provide a laminate panel and a method for its production as well as a counteracting material, whereby it will become possible to spare a counteracting paper for the laminate panel in a more cost-efficient and simple way.

These and other problems that are mentioned when reading the following description or can be recognized by the person skilled in the art are solved with a laminate panel according to claim 1, a method for its production according to claim 16 and a counteracting material according to claim 23.

3. DETAILED DESCRIPTION OF THE INVENTION

According to the present invention, a laminate panel is provided that comprises a carrier layer made of wood or wood-based material. Wood-based materials are materials that are known to the person skilled in the art and typically are used for laminate panels such as MDF ("medium density fiberboard" ("mitteldichte Faserplatte")), HDF ("high density fiberboard" ("hochdichte Faserplatte")) or OSB ("oriented strand board" ("Grobspanplatte")) or other wood-based materials that are known to the skilled person. In general preferably, the carrier layer is a panel made of OSB, MDF or HDF, solid wood or a particle board.

The top surface of the laminate panel comprises a décor such as in particular a décor paper or a décor layer that is printed in the direct printing process. The top surface comprises further at least one layer made of cured resin. This resin may have been for example used for impregnating a décor paper that is provided on the top surface of the laminate panel or an overlay paper.

According to the present invention, the back surface of the laminate panel comprises a counteracting layer made of a cured counteracting material, wherein it is a core of the present invention that the counteracting layer does not comprise a paper layer namely no continuous planar paper layer. This counteracting layer serves to compensate the tractive effect of the layers that are applied onto the top surface. Preferably, the counteracting layer has a thickness of at least 5 μm, preferably, of at least 10 μm, more preferably of at least 15 μm, yet more preferably of at least 50 μm and most preferably of at least 75 μm. Beyond this counteracting layer further layers can be provided on the back surface of the laminate panels that can also include paper layers such as in particular further décor papers, sound protection layers etc.

In preferred embodiments of the present invention the counteracting layer has a thickness in the range of 5 to 300 μm, more preferably in the range of 10 to 200 μm, yet more preferably in the range of 40 to 170 μm, still yet more preferably in the range of 70 to 145 μm and most preferably in the range of 90 to 105 μm. In a further embodiment of the present invention namely in the case that a large amount of amino resin of at least 40 weight percentage is provided in the cured counteracting material, the counteracting layer has a thickness in the range of 100 to 500 μm, more preferably in the range of 130 to 470 μm, yet more preferably in the range of 160 to 440 μm, still yet more preferably in the range of 220 to 380 μm and most preferably in the range of 280 to 320 μm. The measurement parameters used herein generally such as layer thicknesses, weight indications, indications of amount of substance, indications of temperature and pressures, etc. are to be understood as within the scope of typical measurements tolerances as they are self-evident for the person skilled in the art. With layer thicknesses, indications of weight and indications of amount of substance these tolerances are typically 5%.

A reinforcement of the counteracting layer for example by a paper layer as known from the prior art is dispensable for the counteracting layer according to the invention. According to the present invention, 1 Kilogram of the cured counteracting material contains in particular 100 to 900 gram of cured amino resins and 900 to 100 gram filler. Fillers are preferably materials that do not react chemically with the amino resin. Typical fillers are described for application in molding compound in "Duroplaster" Kunststoffhandbuch Bd. 10, S. 156ff., Hanserverlag 1988. Herein the feature "cured" refers to the state of the corresponding materials in the final state of the finished laminate panels. In particular, "cured" with reference to an amino resin designates the cross-linked (cured) state of it, for example after a curing method step. It is furthermore clear to the person skilled in that art that with a weight ratio of 600 gram of amino resin and 300 gram filler the remaining 100 gram are distributed on further possible additives such as curing agent, wetting agent, emulsifiers, thickening agents, plasticizers etc.

In a preferred embodiment of the laminate panel according to the invention 1 kilogram of the cured counteracting material comprises 100 to 800 gram, preferably 150 to 775 gram, more preferably 200 to 750 gram, yet more preferably 300 to 700 gram, still yet more preferably 400 to 650 gram and most preferably 500 to 600 gram of amino resin, and 200 to 900 gram, preferably 225 to 850 gram, more preferably 250 to 800 gram, yet more preferably 300 to 700 gram, still yet more preferably 350 to 600 gram and most preferably 400 to 500 gram fillers.

The addition of fillers to amino resin according to the invention allows a reinforcement of the counteracting material by for example a paper layer being dispensable. It has been surprisingly found that by addition of fillers to appropriate amino resins, the viscosity of the so-produced counteracting material can be adjusted, such that this counteracting material can be applied onto the back surface of the carrier layer in a liquid state during the production process of the laminate panel and in the following can be dried and pressed like an impregnated paper layer and moreover achieves the same effect as a common counteracting paper and that the so-produced layer does not rip or is destroyed otherwise also under extreme stresses such as fulling (Walken) by permanent walking on it or temperature and humidity influence. By this suitable processing viscosity, it is avoided that the counteracting material drips or runs off in further method steps from the back surface of the carrier layer. In a preferred embodiment the application of the counteracting material onto the back surface of the carrier layer is made by rolling on (Aufwalzen), molding or alternatively by applying by jet nozzles or spraying.

As a filler preferably mineral fillers are used. Mineral fillers from the group of silicates and preferably clay, loam, tallow, mica or siliceous earth from Neuburg have proven as particularly preferable, however, in particular kaolin. Alternatively, carbonates or sulfates such as preferably chalk, dolomite or barite but also glass beads are established. Further preferred are fillers such as rock flour, fiber glass, quartz powder, crystalline silicic acid, aluminum hydroxide or magnesium hydroxide, magnesium oxide, zinc oxide or calcium oxides. In particularly preferred embodiments, the filler can furthermore be a mixture of the previously mentioned materials. However, also known or organic fillers such as for example wood dust can be employed.

In a preferred embodiment, the amino resin is a melamine resin or a urea-formaldehyde resin or a mixture of those both resins. These resins are advantageous, because with their production the necessary properties can be easily adjusted such as for example the viscosity and the solid content. Preferably, an amino resin is produced by a mixture and condensation of melamine and/or a urea derivate and an aldehyde, preferably formaldehyde. With the mixtures of these components the exact adjusting of the respective molar ratios can be used for optimizing the properties of the produced amino resin for its usage in the counteracting material.

In a preferred embodiment for producing the amino resin that shall be used for producing the counteracting material an aldehyde (in particular formaldehyde) is mixed with melamine respectively a urea derivate in a particular proportion and is subsequently condensed. This amino resin is then mixed to the counteracting material along with solid fillers, in order to be applied in liquid form. Preferably, for producing the amino resin 1 mol of melamine and/or urea derivate is mixed with 0.5 to 3 mol, preferably 1 to 2.5 mol, more preferably 1.25 to 2.25 mol and most preferably 1.4 to 2.1 mol of aldehyde. In other words, most preferably 1.4 to 2.1 mol of aldehyde are added to a mixture of for example 0.5 mol melamine and 0.5 mol urea derivate (i.e. 1 mol melamine and urea derivate) and are subjected to a chemical condensation reaction.

Such a condensation reaction is performed preferably 60 to 180 min, preferably 80 to 160 min, more preferably 100 to 140 min and most preferably 110 to 130 min at preferably 60° C. to 130° C., more preferably at 70° C. to 120° C., yet more preferably at 80° C. to 110° C. and most preferably at 85° C. to 100° C. By the degree of condensation, inter alia the viscosity can be influenced. It has proven as advantageous to evaluate the degree of condensation of the amino resin over the water tolerance at a water temperature between 18 and 30° C., preferably at 23° C. A water tolerance has proven advantageous within 0.7 to 1.9, preferably within 0.8 to 1.8, more preferably within 0.9 to 1.7, yet more preferably within 1.0 to 1.6 and most preferably within 1.1 to 1.5. Hereby, a water tolerance of for example 1.3 is understood as follows: If one adds to approximately 100 ml of an amino resin at approximately 23° C. an amount of 130 ml distilled water while continuously stirring, this mixture will stay (still) clear. With a higher amount of water, the resin however blurs and a white sediment or a separation of layers of resin and water is formed. After producing the amino resin, the same is mixed with the amount of fillers according to the invention and optionally further additives, in order to produce the counteracting material.

In summary, the core of the present invention is to produce an amino resin preferably of a particular mixture of an aldehyde and a melamine or urea derivate respectively, preferably by condensation, and to mix this amino resin with suitable fillers, wherein the ratios according to the invention are defined in the claims, in order to produce an advantageous counteracting material. This counteracting material comprises on the one hand a suitable viscosity, such that the counteracting material can be applied without additional reinforcement in the form of a paper layer onto the back surface of the carrier layer for a laminate panel. On the other hand, it has been surprisingly found that the material mixture according to the invention does not become brittle after curing, namely after the final curing at the laminate panel, and thus can be used advantageously as a counteracting layer without paper. It is also surprising that no overlapping and thus stiffening fibrous materials are necessary. To the contrary, the fillers as they have been previously used in molding compounds have proven suitable in the described material mixture despite completely different manner of processing. Probably, this is due to the fact that the carrier layer comprises a measure of absorption behavior and that the carrier layer itself undertakes the reinforcement function of the paper by penetration processes into this carrier layer with suitable processing viscosity of the resin-filler-mixture. The given mixture ratios allow for adjusting the tractive properties of the counteracting material according to the invention in a wide range. Thus, it is possible to provide a suitable counteractor on the back surface for a plurality of different layers on the top surface.

In order to further optimize the properties of the counteracting material, plasticizer such as preferably diethylen glycole and/or $\epsilon$-caprolactam and/or sugar can be present in the counteracting material in preferred embodiments. Additionally, it can be advantageous to provide organic substances for a specific adjustment of the processing viscosity such as in particular cellulose acetate, carob flour or the like.

Preferably, one kilogram of the cured counteracting material comprises additionally 1 to 500 gram, preferably 5 to 450 gram, more preferably 10 to 400 gram, yet more preferably 15 to 350 gram, still yet more preferably 25 to 300 gram and most preferably 50 to 250 gram of a plasticizer, preferably diethylen glycole and/or $\epsilon$-caprolactam.

Preferably, one kilogram of the cured counteracting material comprises additionally 1 to 500 gram, preferably 5 to 450 gram, more preferably 10 to 400 gram, yet more preferably 15 to 350 gram, still yet more preferably 25 to 300 gram and most preferably 50 to 250 gram of a thickening agent, preferably of a sugar, more preferably of a polysaccharide.

According to the present invention, furthermore a method for producing the above described laminate panel is provided. According to the invention, with this method a counteracting material is applied onto the back surface of the carrier layer of the laminate panel in liquid state, wherein this counteracting material does not include a paper layer. Herein "liquid" means viscous in a suitable way, such that the counteracting material can be applied to the back surface of the carrier layer for the laminate panel.

In other words, the method according to the invention differs from the known method thereby, that no counteracting paper is necessary for producing a counteractor. As a result, as described above, of the counteracting material comprising a suitable viscosity, it is possible to apply the counteracting material onto the back surface of the laminate panel preferably by rolling on, molding or applying by jet nozzles or spraying respectively, without the counteracting material dripping or running off for example due to low viscosity of the carrier layer. After application, the counteracting material can be pre-dried or can be directly cured for instance by application of radiation such as electron radiation, UV radiation and/or infrared radiation, preferably however by influence of heat and pressure during the pressing of the laminate panel.

In a preferred embodiment, the counteracting material is cured simultaneously with the resins on the top surface of the carrier layer. The simultaneous curing of the counteracting material and the resins on the top surface of the panel has the advantage, that the contraction effects on both surfaces of the laminate panel cancel each other out optimally and thus curvatures of the panel can be optimally reduced.

In a preferred embodiment, the method according to the invention includes a method step prior to the application of the counteracting material onto the back surface of the carrier layer, at which the amino resin is produced by mixing of (i) melamine and/or a urea derivate and (ii) an aldehyde, preferably formaldehyde, wherein, for producing the amino resin, 1 mol of the melamine and/or urea derivate is mixed with 0.5 to 3 mol, preferably 1 to 2.5 mol, more preferably 1.25 to 2.25 mol and most preferably 1.4 to 2.1 mol of the aldehyde and is condensed.

In a preferred embodiment, the liquid counteracting material comprises a viscosity of 500 to 100,000 mPas (Brookfield, spindle 6), preferably of 5,000 to 98,000 mPas, more preferably of 10,000 to 95,000 mPas, yet more preferably of 20,000 to 90,000 mPas, still yet more preferably of 30,000 to 80,000 mPas and most preferably of 40,000 to 70,000 mPas.

In the following, non-limiting examples are given that shall facilitate the understanding of the invention:

For producing the counteracting material firstly a suitable amino resin is produced. For this purposes, 30 kg melamine (corresponding 238 mol) is mixed with 32.8 kg aqueous 37% formaldehyde solution (corresponding to 405 mol) in a container (i.e. 1 mol melamine is mixed with 1.7 mol aldehyde) and the pH-value is adjusted with 30% sodium hydroxide solution to 9.3. Subsequently, it is heated within 15 minutes while stirring to 92° C., it is stirred at this temperature for 120 minutes and finally within 15 minutes it is cooled off to room temperature.

With this procedure the components react chemically with each other (i.e. they condense) and an aqueous melamine resin is formed with a viscosity of 14 to 17 s (ISO2431 and DIN 53211; DIN Becher, nozzle (Düse) 4 mm) and a water tolerance of 1.3+/−0.1. Now a typical melamine resin curing agent is added to the so-produced resin such that a blurring time of 240 s is obtained. In the following, 50 kg of a filler namely kaolin in powder form, 100 gram of a common defoamer as well as 1 kg of a dispersing agent are added and the ensemble is again stirred for 30 minutes. Subsequently, 3 kg diethylen glycole as well 15 kg non-refined beet sugar as plasticizers are added and again stirred for 60 minutes. This mixture is applied by means of a molding curtain (Gießvorhang) onto a HDF-carrier plate, in fact 120 g/m² of this mixture are poured onto it. The so-treated carrier plate is pre-dried in a jet dryer for 90 s at 190° C. Subsequently, the carrier plate is turned around such that the counteracting layer is on the bottom surface of the plate. Onto the top surface an impregnated décor paper and an impregnated overlay are applied. The package is pressed for 20 s at a temperature of 185° C. and the specific pressure of 35 bar.

Also, without pre-drying it is clear to the person skilled in the art that at the latest after curing of the counteracting material at the panel the water, that is still contained during applying the counteracting material, is almost completely evaporated (in the final cured state at the panel, the counteracting material contains less than 5 weight percentage water, typically approximately 2 to 7% water).

The indications of quantity defined in the description and the claims that refer to the cured counteracting material are also useable when producing the counteracting material: As explained above and known to the person skilled in the art, amino resins are produced by condensation of for example formaldehyde with urea or melamine. The synthesis reaction is carried out in an aqueous medium, beyond that additional water is formed as is known by condensation of the reactant (i.e. formaldehyde with urea or melamine). That is, the "aqueous" amino resin that is processed for the counteracting mixture contains water. The contained water is vaporized substantially at pre-drying during the curing process that normally proceeds via two steps (pre-drying and then pressing/curing), during pressing again water is formed in a low extent by polycondensation which water however is driven out by heat and pressure during pressing. In order to be able to define the amount of remaining condensed resin of the original aqueous amino resin, the term "solid content (Feststoffgehalt)" has been introduced in the prior art. The term indicates with a sufficient approximation how much solid mass from an aqueous amino resin finally remains after curing for example at a product, in this case in the counteracting layer, from the aqueous amino resin. This solid content of a resin can for example be determined according to DIN 16916-2 (old) or DIN 16945.

When herein the indications of weight are referring to "amino resin" (as for example in claim 1), therewith always the solid content of the amino resin is meant thus the weight of the amino resin in the cured state as defined above, unless something else is specified. The above findings shall be explained with an example: If for example 1 Kilogram of aqueous amino resin is determined with a solid content of 60%, thus the water content amounts to 40% or 400 gram, i.e. after curing approximately 600 gram solid mass remain (thus "amino resin" according to the above definition). The water content is, as explained above, the sum of:

(a) Water that has been added during the synthesis,
(b) Water that is formed as condensation water during the synthesis and
(c) Poly-condensation water that is additionally formed during the final curing by polycondensation.

"Approximately", because there are standards for determining the solid contents that slightly differ from each other and because of course as it is known to the person skilled in the art the occurring curing process is inevitably subject to slight deviations in reality. However, the deviations originating therefrom are nominal and lie in the tolerance range for the present method.

The proportions of amino resin and filler desired in the cured state as they are defined in claim 1 can be achieved in the counteracting material thus thereby that one determines during production of the counteracting material the solid content of the aqueous amino resin as specified and takes this value as a basis during the addition of further substances. The same applies accordingly also to indications of quantity for the addition of plasticizers and thickening agents, etc.

4. DESCRIPTION OF THE FIGURES

In the following, the invention is explained in detail on the basis of the enclosed figures, wherein.

Figure 1:
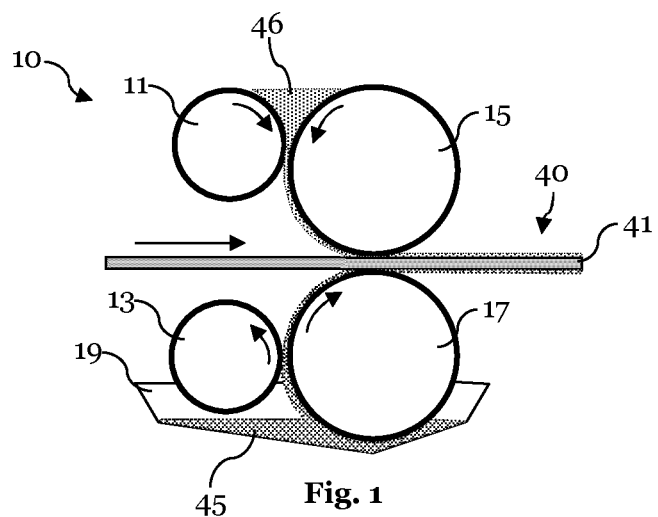
FIG. 1 illustrates a schematic illustration of an application device for applying the counteracting material according to the invention.

FIG. 1 illustrates a device 10 for applying a counteracting material 45 onto a back surface of a laminate panel 40. As one can see in the Figure, a carrier layer 41 such as a MDF layer is guided from left to right by the application device 10 for applying the counteracting material 45 and a resin 46. For this, the carrier layer 41 is guided between a counteracting material application roller 17 and a resin application roller 15. The counteracting material application roller 17 is partly located in a counteracting material reservoir 19 that, as can be seen from the Figure, is partly filled with an aqueous counteracting material 45. By the simultaneous rotation of the counteracting material application roller 17 and the movement of the carrier layer 41 the aqueous but sufficiently viscous counteracting material 45 is applied from the roller 17 onto the back surface of the carrier layer 41.

A proportioning roller 13 serves for guiding excess counteracting material 45 back into the reservoir 19 again and simultaneously pre-adjusting appropriately the thickness of the counteracting material 45. In the illustrated device 10, a resin 46 is applied by means of a resin application roller 15 onto the carrier layer simultaneously with the counteracting material 45 onto the top surface of the carrier layer 41. As can be seen from the Figure, the resin application roller 15 forms a funnel-shaped supply area with a further proportioning roller 11, in which a supply of resin 46 is located. In the shown case, the carrier layer for example can be provided already with a décor such as for example with a décor produced in the direct print, during entry into the application device 10 and the resin 46 serves in this case for example for sealing the décor layer. Alternatively, the resin can be provided with abrasion-resistant particles such as corundum particles for producing an abrasion-resistant surface of the laminate panel.

As can be taken from FIG. 1, it is an essential feature of the counteracting material that it comprises a suitable viscosity such that the counteracting material can be applied onto the back surface of the carrier layer 41 by means of an application roller 17. This suitable viscosity is achieved as described above. Thus it becomes possible, as shown in FIG. 1, to apply the counteracting material without additional reinforcement, (as for example by a paper layer) virtually self-supporting onto the back surface of the carrier layer 41.

Figure 2:
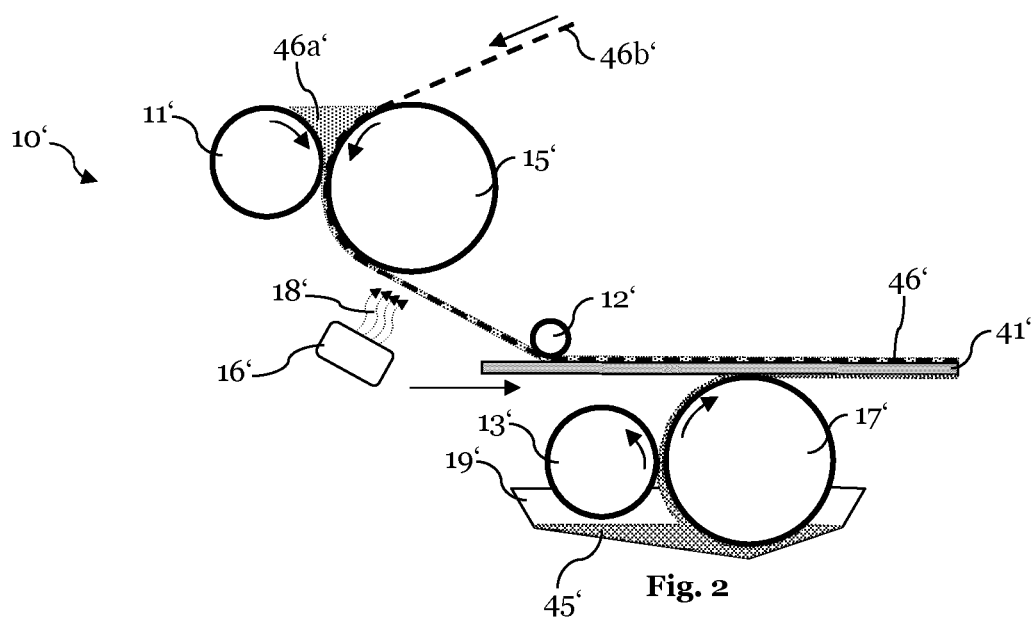
FIG. 2 illustrates a further application device for the counteracting material according to the invention, at which additionally a core layer is provided in the form of a décor paper.

In FIG. 2, a further embodiment of an application device 10' is illustrated. Also in this embodiment, the counteracting material 45' is applied in a roller application process by means of a counteracting material application roller 17', a portioning roller 13' and a counteracting material reservoir 19' onto the back surface of the carrier layer 41' for a laminate panel. Alternatively, the counteracting material 45', according to the invention, can however also be applied with any other suitable application process such as for example by applying by jet nozzles or spraying onto the back surface of the carrier layer 41'.

In contrast to the example shown in FIG. 1, in FIG. 2 a device for applying a décor paper layer 46' is illustrated. Hereto, a décor paper 46b' is lead via a first roller 15' into a final-shaped reservoir, that is formed from the first roller 15' and a portioning roller 11' and in which a supply of a suitable resin 46a' is located. Thereby, the counteracting paper 46b' is soaked and impregnated with a resin such as for example an amino resin. As shown in the Figure, the so-impregnated décor paper 46' can be dried in a drying device 16' for example with hot air 18'.

After drying, the impregnated décor paper is applied via a deflecting roller 12' onto the top surface of the carrier layer 41'. After passing the shown application device 10' further layers can be applied such as for example an overlay layer onto the top surface or a footstep sound insulation layer on the back surface of the carrier layer 41' prior to pressing the so-produced layer system in a known way via pressure and temperature to a laminate panel.

Also, in particular further paper layers may be provided on the back surface of the carrier layer 41' for example a protection layer made of paper, however it is essential to the present invention that the counteracting material 45' is adjusted by the mixture according to the invention of aldehyde, amino resin and fillers such that it can be applied without necessary support of a further reinforcement such as for example a paper layer, onto the back surface of the carrier layer 41'.

The cured counteracting material is able to compensate for contraction effects of the layers that are applied onto the top surface of the carrier layer 41'. Preferably the counteracting layer should have a thickness in the cured state of at least 5 μm preferably of at least 10 μm, more preferably of at least 15 μm, yet more preferably of at least 50 μm and most preferably of at least 75 μm.

Figure 3:
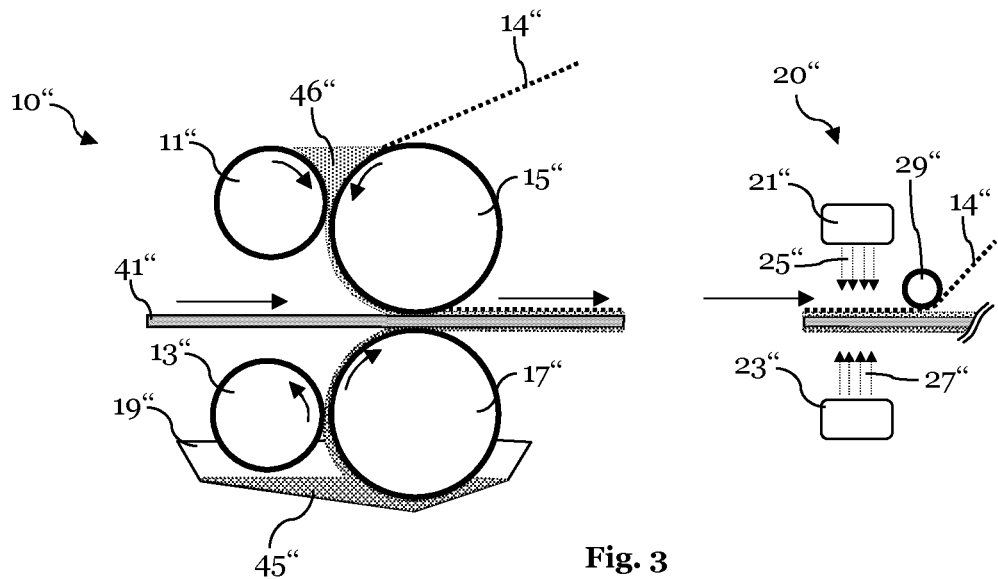
FIG. 3 illustrates a yet further application device for applying the counteracting material according to the invention with a curing device.

FIG. 3 illustrates a further embodiment of an application device 10'' and a curing device 20'' that is located subsequently in the process. Also in the application device 10'' according to FIG. 3, the counteracting material is applied by means of a counteracting material application roller 17'' onto the back surface of a carrier layer 41''. The device shown in FIG. 3 is substantially identical to the device that is shown in FIG. 1 with a difference that an additional embossing foil 14'' is used in the device according to FIG. 3. This embossing foil is applied by means of a resin application roller 15'' along with the resin onto the top surface of the carrier layer 41''. This embossing foil remains on the upper resin layer during the curing process in order to give it, as it is known to the person skilled in the art, a structure for example for imitation of a real wood structure or a stone structure. After curing, the embossing foil is removed as is shown in the Figure.

The curing of the upper resin layer as well as the counteracting layer is made for example in a curing device 20''. This device can for example consist of radiation sources 23'', 21'' that for example emit electron radiation, ultraviolet radiation or infrared radiation, in order to cure the upper resin layer and the counteracting layer. As is known to the person skilled in the art, a polycondensation takes place during curing, by which the used resins for example the amino resins are crosslinked (vernetzt). In contrast to the drying, thus a chemical change of the resins takes place; whereas, during drying merely water is removed.

By the mixture according to the invention of amino resin with filler not only a suitable viscosity of the counteracting material is achieved that allows applying the counteracting material virtually unsupported onto the back surface of the carrier layer, but the mixture according to the invention avoids also that the counteracting material becomes brittle after curing. Thus, the cured counteracting material can advantageously be used as a counteractor without counteracting paper.

As the person skilled in the art can see, the curing of the counteracting material and the upper resin can, alternatively to the shown radiation curing method, also be made by pressure and heat, for example during pressing the layer system to a laminate panel. In a preferred embodiment, the curing of the counteracting material and the resin layer on the top surface of the carrier layer is made substantially simultaneously, such that contraction effects by the layers on the top surface of the carrier layer are optimally compensated by the curing of the counteracting material on the back surface.

Figure 4:
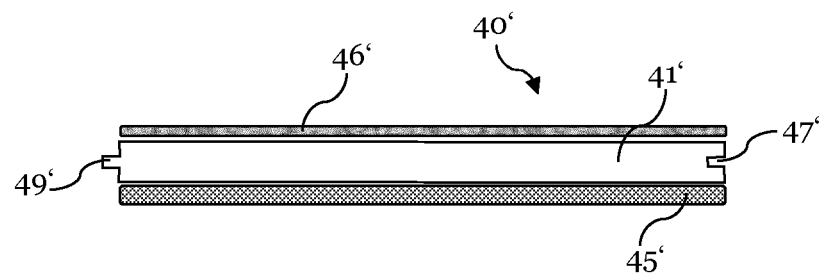
FIG. 4 illustrates a first embodiment of a laminate panel with a counteracting layer.

FIG. 4 illustrates a schematic illustration of a laminate panel 40' according to the invention, with a counteracting layer 45' without a paper layer, a carrier layer 41' and a décor with a layer made of cured resins 46'. The carrier layer 41' consists of wood or wood-based material, preferably of MDF, HDF or OSB or similar wood-based materials as they are known to the person skilled in the art. The shown laminate panel can for example be used for forming a floor in the interior of a house, wherein the laminate panels are connected by means of tongue and groove connections 47', 49' with each other, as they are known to the person skilled in the art.

Figure 5:
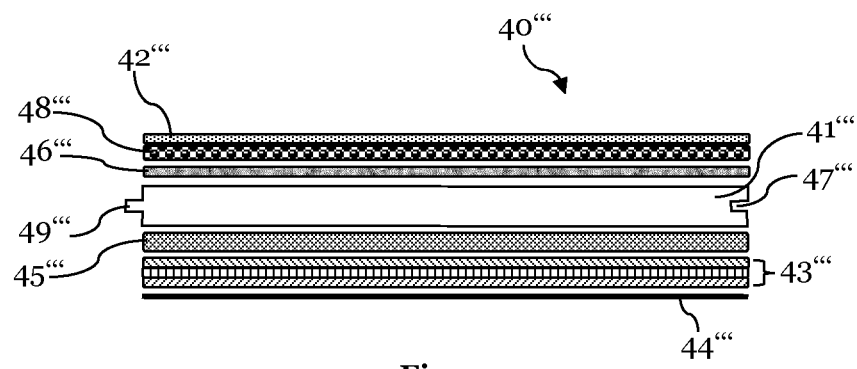
FIG. 5 illustrates a further embodiment of a laminate panel with a counteracting layer.

FIG. 5 shows a schematic illustration of a further embodiment of a laminate panel 40''' according to the invention. As can be taken from FIG. 5, the laminate panel 40''' comprises a carrier layer 41''' with tongue and groove connections 47, 49''' that has a counteracting layer 45''' according to the invention on its back surface. On the top surface of the laminate panel 41', a décor layer 46' is located that is provided, as described above, for imitation of for example a wood surface.

The shown laminate panel 40' comprises further layers namely an overlay layer 42''', a footstep sound insulation layer 43' that consists of three layers in the shown case and a lower protection layer made of 44' paper. The overlay layer 42''' can for example be a paper layer that is impregnated with an amino resin. Additionally, the laminate panel 40''' comprises in the shown case a layer of abrasion-resistant particles such as for example corundum particle 48'. As is known to the person skilled in the art, these abrasion-resistant particles can alternatively be distributed on the entire top layer, in particular also be comprised in overlay 42'''.

Additionally, abrasion-resistant particles can also be located in a layer on the back surface of the carrier layer 41'.

The invention claimed is:

1. A laminate panel, comprising a carrier layer made of wood or wood-based material, wherein at least the top surface of the laminate panel comprises a décor and a layer made of cured resin and wherein the back surface of the laminate panel comprises a counteracting layer made of a cured counteracting material and wherein the counteracting layer does not comprise a paper layer, and one kilogram of the cured counteracting material consists of the following components:
   Amino resin: 300 to 700 gram
   Filler: 300 to 700 gram
   and wherein the amino resin is produced by mixing of (i) melamine and/or an urea derivate and (ii) an aldehyde,
   wherein for producing the amino resin 1 mol of melamine and/or urea derivate is mixed with 0.5 to 3 mol of aldehyde, and
   wherein the counteracting layer has a thickness of at least 5 μm.

2. The laminate panel according to claim 1, wherein for producing the amino resin 1 mol of melamine and/or urea derivate is mixed with 1 to 2.5 mol of aldehyde.

3. The laminate panel according to claim 1, wherein one kilogram of the cured counteracting material comprises 400 to 650 gram of amino resin.

4. The laminate panel according to claim 1, wherein one kilogram of the cured counteracting material comprises 350 to 600 gram fillers.

5. A laminate panel comprising a carrier layer made of wood or wood-based material, wherein at least the top surface of the laminate panel comprises a décor and a layer made of cured resin and wherein the back surface of the laminate panel comprises a counteracting layer made of a cured counteracting material and wherein the counteracting layer does not comprise a paper layer, and one kilo of the cured counteracting material consists of the following components:
   Amino resin: 300 to 700 gram
   Filler: 300 to 700 gram
   and wherein the amino resin is produced by mixing of (i) melamine mine and/or an urea derivate and (ii) an aldehyde,
   wherein for producing the amino resin 1 mol of melamine and/or urea derivate is mixed with 0.5 to 3 mol of aldehyde, and
   wherein the filler is a mineral filler.

6. The laminate panel according to claim 1, wherein the filler comprises one or more of the following materials:
   a silicate; carbonates or sulfates; or rock flour, fiber glass, quartz powder, crystalline silicic acid, aluminum hydroxide or magnesium hydroxide, magnesium oxide, zinc oxide or calcium oxides.

7. The laminate panel according to claim 1, wherein one kilogram of cured counteracting material comprises additionally 1 to 500 gram of a plasticizer.

8. The laminate panel according to claim 1, wherein one kilogram of the cured counteracting material comprises additionally 1 to 500 gram of a thickening agent.

9. The laminate panel according to claim 1, wherein the filler includes further an organic filler.

10. The laminate panel according to claim 1, wherein the laminate panel includes at least one further layer made of paper.

11. The laminate panel according to claim 1, wherein the décor is a décor layer in the form of a pressed, impregnated décor paper.

12. The laminate panel according to claim 1, wherein the décor is produced in a direct print process.

13. The laminate panel according to claim 1, wherein one kilogram of the cured counteracting material comprises 400 to 650 gram of amino resin and 350 to 600 gram of filler.

14. A method for producing a laminate panel, wherein the method comprises the following steps:
   providing a carrier layer;
   providing a décor at least on the top surface of the carrier layer;
   applying of resin onto the top surface of the carrier layer in liquid state;
   applying a counteracting material that does not comprise a paper layer onto the back surface of the carrier layer in liquid state;
   in a subsequent method step curing the resin and the counteracting material; and
   after or during the curing of resin and the counteracting material, pressing the layers that are produced in the previous method steps to form a laminate panel; and
   wherein prior to the application of the counteracting material onto to the back surface of the carrier layer, the amino resin of the counteracting material is produced by mixing of (i) melamine and/or an urea derivate and (ii) an aldehyde, wherein for producing the amino resin 1 mol of melamine and/or urea derivate is mixed with 0.5 to 3 mol of aldehyde.

15. The method according to claim 14, wherein the resin of the top surface of the laminate panel and the counteracting layer on the back surface of the laminate panel are cured essentially simultaneously.

16. The method according to claim 14, wherein the application of the counteracting material is made in a roller-coating process or by spraying or applying by jet nozzles.

17. The method according to claim 14, wherein for producing the amino resin 1 mol of melamine and/or urea derivate is mixed with 1 to 2.5 mol of aldehyde.

18. The method according to claim 14, wherein in a method step prior to the application of the counteracting material to the lower surface of the carrier layer, the amino resin of the counteracting material is mixed with fillers in order to produce a counteracting material.

19. The method according to claim 14, wherein the curing of the counteracting material and/or the resin at the top surface of the carrier layer is made by means of radiation.

20. The method according to claim 14, wherein the curing of the counteracting material and/or the resin at the top surface of the carrier layer is made by heat and/or by pressure.

21. A counteracting material suitable for use as a counteracting layer without a paper layer for laminate panels, that comprise a carrier layer made of wood or wood-based material, wherein at least the top surface of the laminate panel comprises a décor and a layer made of a cured resin, wherein 1 kilogram of the counteracting material in the cured state comprises:

Amino resin (cured): 100 to 900 gram
Filler: 900 to 100 gram, wherein
the amino resin is produced by mixing of 1 mol melamine and/or urea derivate with 0.5 to 3 mol aldehyde, wherein the filler is a mineral filler.

22. The counteracting material according to claim 21, wherein the aldehyde is formaldehyde.

23. The counteracting material according to claim 21, wherein the liquid counteracting material has a viscosity of 500 to 100,000 mPas.

* * * * *